United States Patent [19]
Gengler et al.

[11] Patent Number: 5,260,695
[45] Date of Patent: Nov. 9, 1993

[54] COLOR MAP IMAGE FADER FOR GRAPHICS WINDOW SUBSYSTEM

[75] Inventors: Joel D. Gengler, Boulder; Brad D. Reak, Loveland, both of Colo.

[73] Assignee: Hewlett-Packard Company, Palo Alto, Calif.

[21] Appl. No.: 939,847

[22] Filed: Sep. 2, 1992

Related U.S. Application Data

[63] Continuation of Ser. No. 648,089, Jan. 31, 1992, which is a continuation-in-part of Ser. No. 494,031, Mar. 14, 1990, abandoned.

[51] Int. Cl.$^5$ .............................................. G09G 1/28
[52] U.S. Cl. ................................. 345/153; 358/182; 345/115
[58] Field of Search ............... 340/702, 723, 721; 358/22, 182

[56] References Cited

U.S. PATENT DOCUMENTS

| | | | |
|---|---|---|---|
| 2,412,279 | 12/1946 | Miller, Jr. ............................ | 358/182 |
| 2,964,589 | 12/1960 | Walker ................................ | 358/182 |
| 4,149,184 | 4/1979 | Giddings et al. .................... | 340/703 |
| 4,223,351 | 9/1980 | Tsujimura et al. .................. | 358/182 |
| 4,542,376 | 9/1985 | Bass et al. .......................... | 340/723 |
| 4,668,989 | 5/1987 | MacKereth .......................... | 358/182 |
| 4,704,605 | 11/1987 | Edelson ............................... | 340/703 |

Primary Examiner—Ulysses Weldon
Assistant Examiner—Matthew Luu

[57] ABSTRACT

A color map image fader which lets a user draw one or more planar images and then fade them in or out for visual effect. An image frame buffer is subdivided to store multiple images provided by the user, and the resulting multiple images are combined as a single image within a display window on a pixel by pixel basis by the invention. The invention sums the pixel color data on a per-pixel basis, and the pixel data is scaled as a separate operation using color map entries. This permits image fading, which is used in conjunction with the image blending to provide real-time fading of one image into another or is used alone to simply fade one image on a per-pixel basis. The fading may be done by scaling all of the entries from a color map by some value, and this can be done without redrawing the image. The invention also allows for separate processing of data within each window by defining each pixel with respect to its window boundaries.

6 Claims, 3 Drawing Sheets

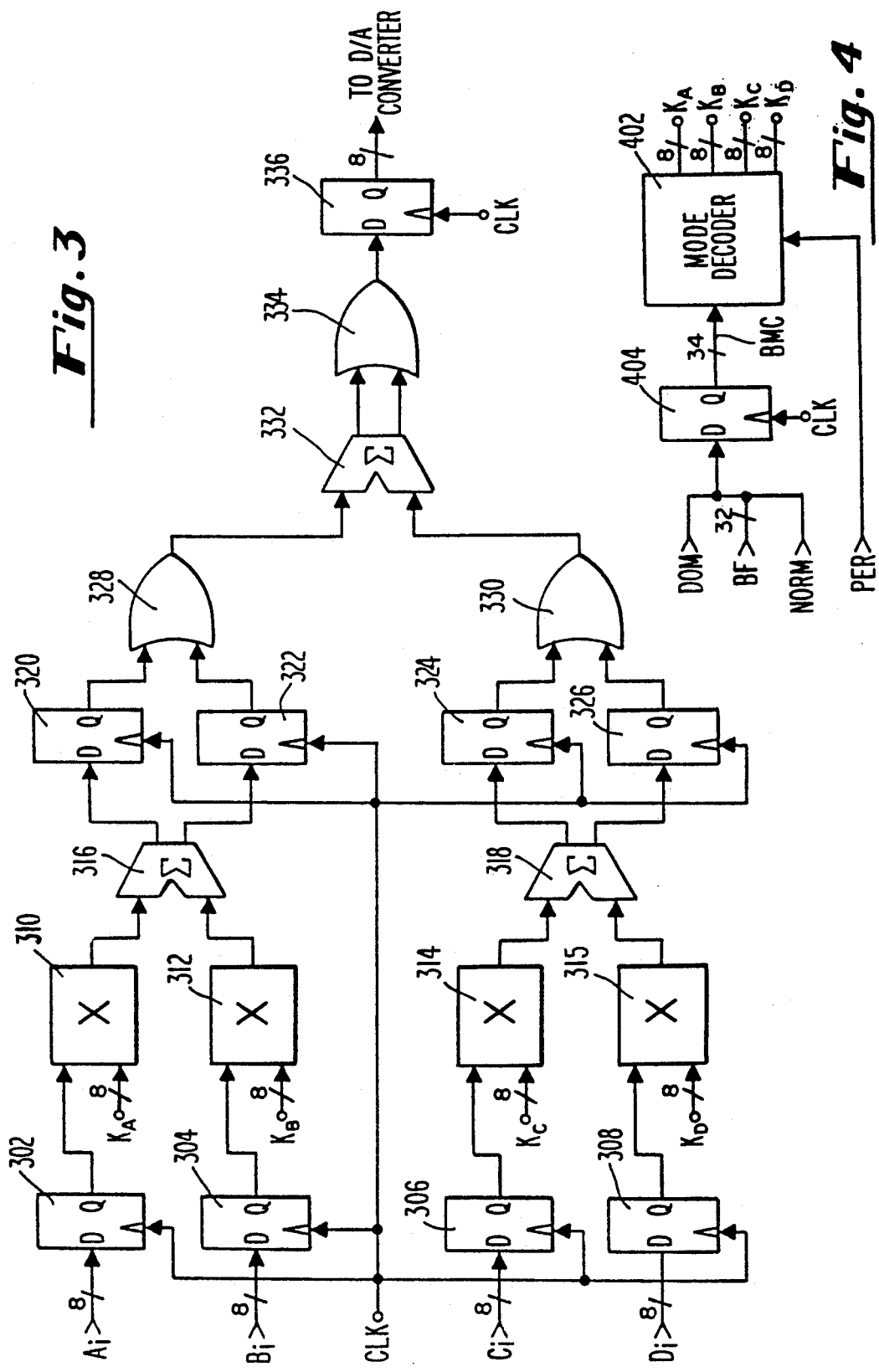

COLOR MAP IMAGE FADER FOR GRAPHICS WINDOW SUBSYSTEM

CROSS-REFERENCE TO RELATED APPLICATIONS

This is a continuation of application Ser. No. 07/648,089, filed Jan. 31, 1992, which is a continuation-in-part of U.S. patent application Ser. No. 07/494,031 filed Mar. 14, 1990 by Gengler et al., now abandoned, entitled "Digital Image Blending on a Per Pixel Basis", the contents of which are hereby incorporated by reference.

BACKGROUND OF THE INVENTION

1. Field of the Invention

The present invention relates to raster scanned video display devices, and more particularly, to a method and apparatus for blending and/or fading a plurality of digital images on a pixel by pixel basis for display on a display monitor.

2. Description of the Prior Art

Typically, image data for display on a raster scanned display device is stored in a circuit called a frame buffer. The frame buffer is preferably wide enough to accommodate the largest image display mode. Typical frame buffer widths are 8, 16 or 24 planes, where a plane is normally one bit of information wide. The raster images are drawn by processing the data value stored in the frame buffer to arrive at values suitable for display.

For example, as shown in FIG. 1, an image frame buffer 102 having 24 planes of information and three bits of window/overlay plane information may provide its outputs to display mode controller 104, where a display mode, such as full color, eight-bit indexed, and the like is determined. The data output of the display mode controller 104 is typically post-processed in another device called a color map, also known as a color table, color look-up table or color ROM. As shown, a different color map may be provided for the red (106), green (108) and blue (110) colors. The outputs from the display mode controller 104 are typically provided as indices to the respective color maps, and for the eight plane shown, $2^8$ ($=256$) intensity values for red and for green and for blue may be respectively provided. Thus, the color intensity values stored in the color maps are accessed for one or more adjacent pixels by using the inputted planes as indices to these intensity values and then outputting the result.

Each color map thus translates the image data into component colors, which are normally, but not necessarily, red, green and blue (RGB). Often data from the image frame buffer 102 is also multiplexed into the color maps to create different display modes by display mode controller 104. Most display devices then use the output of the color maps to feed the input of three digital to analog converters 112, 114 and 116, respectively, to obtain an RGB analog video signal which is then used to drive the video display unit. Of course, for a monochrome display, only one digital to analog converter is necessary.

In such raster scanned frame buffers, it has often been desirable to segment the frame buffer 102 into regions of interest called "windows". Separate and independent windows have been used to provide independent modes of display. Normally, the window regions within the image frame buffer 102 are identified by extending the frame buffer width another three or four planes as shown in FIG. 1 to allow for a tag field, by which each display region may be identified. A tag field of three planes allows for eight unique windows, where a tag field of four planes allows for sixteen unique window regions.

When it has been desired to combine a plurality of images output from display circuits of the type shown in FIG. 1, the analog RGB outputs of each circuit are added together before being input to the video display unit. In particular, analog RGB outputs for each image to be displayed are summed in an analog adder and then clamped at a predetermined level so as not to oversaturate the video display device. This combining occurs during scanning in order to achieve the proper result.

However, the prior art technique of combining the analog RGB signals for display in this manner has numerous drawbacks. In particular, since the blending occurs after the digital to analog conversion, the blending is difficult to achieve on a pixel by pixel basis, and accordingly, window boundaries may not be properly distinguished for display. Moreover, only one color map is provided for the entire display device, and thus, separate color maps for each image may not be provided. In addition, the prior art technique has problems in that the digital to analog converters must be matched to each other or else intensity changes will occur between respective images. Blending of the signals in this manner also causes bandwidth problems, for since processing is performed in analog, the summing amplifiers must have extremely high bandwidths.

On the other hand, when it has been desired to combine a plurality of images output from display circuits of the type shown in FIG. 1, the image has been redrawn with the appropriate scaling down (or fading) of the color intensities. No mechanism has previously been provided for effectively varying on a window basis how the image from the frame buffer is perceived except by redrawing the images or reloading the color maps. Of course, this requires that the frame buffer be updated accordingly for the faded image and that additional image processing time be used. Moreover, such prior art techniques do not occur on a pixel by pixel basis and thus do not permit window boundaries to be properly distinguished for display.

Accordingly, there is a need in the art for a process and apparatus which enables a plurality of images to be blended and/or faded for display on a pixel by pixel basis. In addition, there is a need in the art for a process and apparatus which enables window boundaries to be distinguished in the displayed image so that separate processing may occur in each window. The present invention has been designed for these purposes.

SUMMARY OF THE INVENTION

The above-mentioned needs in the art have been met in accordance with the present invention, which relates to a method and apparatus for subdividing a frame buffer, along window plane boundaries, into multiple images which are then processed through independent color maps and blended into a single image on arbitrary window boundaries. Each window region may be configured, for example, via software such that the window regions are independent, and image blending and/or fading can be on or off with no loss of frame buffer capability to other window regions. In other words, separate image regions may be defined and overlayed where one image is dominant or where two or more images may be seen at each point. Display cursors and overlay planes may be handled as a special case of the general blending and/or fading, whereby the display cursors and overlay planes are blended with the window images and hence are selectively visible or invisible. Moreover, separate image regions may be faded in or out of other windows for visual effect.

In accordance with the invention, a device is provided for fading a digital image on a pixel by pixel basis for display on a display device. Such a device in accordance with the invention preferably comprises means for providing the digital image for display, means for scaling the digital image on a pixel by pixel basis using a scaling factor between 0 and 1 and means for converting an output of the scaling means into an analog signal for display on the display device. Such scaling allows the pixels of the input images to be faded from zero intensity to their original intensity values. Preferably, the providing means of such a device comprises an image frame buffer which is subdivided, along display window boundaries, into a plurality of digital images for display. The digital images preferably are in the same display window of the display device. The providing means may also comprise a display mode controller for providing separate modes of display for each display window and may further comprise at least one color map for each display window for translating digital representations of the digital images into component colors of the digital images.

In a preferred embodiment of the invention, the scaling means comprises a blending/fading circuit for each component color of the digital image, where each blending/fading circuit fades at least one of the component colors of the digital image on a pixel by pixel basis. Each blending/fading circuit comprises means for scaling respective inputs thereof by scaling factor K, where $0 \leq K \leq 1$, pixel adding means for adding corresponding pixels of the same color component from at least one digital image which is to be passed to the output, and clamping means for clamping a sum output of the pixel adding means to prevent oversaturation of the resulting image.

The invention further includes a device for selectively fading at least two digital images on a pixel by pixel basis for display on a display device. Such an embodiment of the invention includes an image frame buffer which is subdivided, along display window boundaries, into the at least two digital images for display and a display mode controller for providing separate modes of display for each of the display windows. The embodiment is further characterized by means for scaling the at least two digital images on a pixel by pixel basis by respective scaling factors between 0 and 1. Such a scaling means in accordance with the invention comprises a blending/fading circuit for each component color of the digital images, each blending/fading circuit fading at least one of the component colors from each of the digital images on a pixel by pixel basis. An output of the scaling means is then converted by converting means into an analog signal for display on the display device.

In accordance with such an embodiment, each blending/fading circuit preferably comprises means for scaling each input digital image by scaling factor K, where $0 \leq K \leq 1$ and passing the scaled digital image to an output. Each blending/fading circuit further comprises pixel adding means for adding corresponding pixels of the same component from each digital image which is to be passed to the output and clamping means for clamping a sum output of the pixel adding means to prevent oversaturation of the resulting image.

The scope of the invention also includes a method of fading a digital image on a pixel by pixel basis for display on a display device. Such a method in accordance with the invention preferably comprises the steps of providing the digital image for display, scaling the digital image on a pixel by pixel basis by a scaling factor between 0 and 1 and converting an output of the scaling step into an analog signal for display on the display device. Preferably, the providing step comprises the step of subdividing an image frame buffer along display window boundaries into a plurality of digital images for display and the further step of providing separate modes of display for each display window of the image frame buffer. The method of the invention also comprises the further step of translating digital representations of the digital images into component colors of the digital images.

In accordance with a preferred method of the invention, the scaling step comprises the step of multiplying at least one of the component colors of the digital image by scaling factor K, where $0 \leq K \leq 1$, on a pixel by pixel basis. Preferably, the scaling step comprises the further steps of adding corresponding pixels of the same component from at least one digital image which is to be passed to the output and clamping a sum output of the pixel adding step to prevent oversaturation of the resulting image.

The invention further comprises a method of selectively fading at least two digital images on a pixel by pixel basis for display on a display device. Such a method preferably comprises the steps of:

subdividing an image frame buffer along display window boundaries into the at least two digital images for display;

providing separate modes of display for each display window;

scaling images within a display window on a pixel by pixel basis by respective scaling factors between 0 and 1, the scaling step including the step of fading corresponding component colors from each of the digital images on a pixel by pixel basis; and converting an output of the scaling step into an analog signal for display on the display device.

Preferably, the digital image fading step comprises the further steps of adding corresponding pixels of the same component from each digital image which is to be passed to the output and clamping a sum output of the pixel adding step to prevent oversaturation of the resulting image.

These and other features of the invention enable the invention to provide images which may be distinguished on window boundaries for display and to allow separate processing for the images in separate windows. Moreover, no intensity adjustments are necessary since the image blending and/or fading is done in digital form, and as a result, improved processing speed is possible. These and other features of the invention will be made more clear from the following detailed description.

BRIEF DESCRIPTION OF THE DRAWINGS

The objects and advantages of the invention will become more apparent and more readily appreciated from the following detailed description of the presently preferred exemplary embodiment of the invention taken in Conjunction with the accompanying drawings, of which:

FIG. 3 schematically illustrates a block diagram of a preferred embodiment of a blending/fading circuit of the type shown in FIG. 2 in accordance with the invention.

FIG. 4 schematically illustrates a mode decoder which provides control signals to the digital image blending/fading circuits of FIGS. 2 and 3 in accordance with the invention.

DETAILED DESCRIPTION OF THE PRESENTLY PREFERRED EXEMPLARY EMBODIMENT

The inventors of the subject matter disclosed and claimed herein have satisfied the above-mentioned needs in the art by developing a digital image blending/fading technique which lets a user blend several window images plus an additional cursor or overlay image using overlay planes by summing the images using a scalable blend function so as to fade a window image into another, thereby providing a more versatile display. Such a blender/fader may be responsible for the summation of pixel color data, and the actual scaling need not be done as a separate operation on color map entries. Such "image blending" as defined for the purpose of this application is the summation of like colors from different color maps. For example, eight bits of red intensity information from four different color maps may be summed together and clamped to produce a total red intensity level. Green and blue values are treated in a like manner. "Image fading" in accordance with the invention, on the other hand, is accomplished by scaling all of the entries in a color map by some value. Fading may be used in conjunction with digital blending to provide real-time fading of one image into another or can be used by itself to simply fade one image. Image intensity scaling is thus accomplished in accordance with the invention by scaling data from the color maps to achieve the desired visual effect.

A digital image blending/fading device which permits real-time operation on a per-window basis in accordance with a presently preferred exemplary embodiment of the invention will now be described with reference to FIGS. 2-4. It will be appreciated by those of ordinary skill in the art that the description given herein is for exemplary purposes only and is not intended in any way to limit the scope of the invention. All questions regarding the scope of the invention may be resolved by referring to the appended claims.

Figure 1:
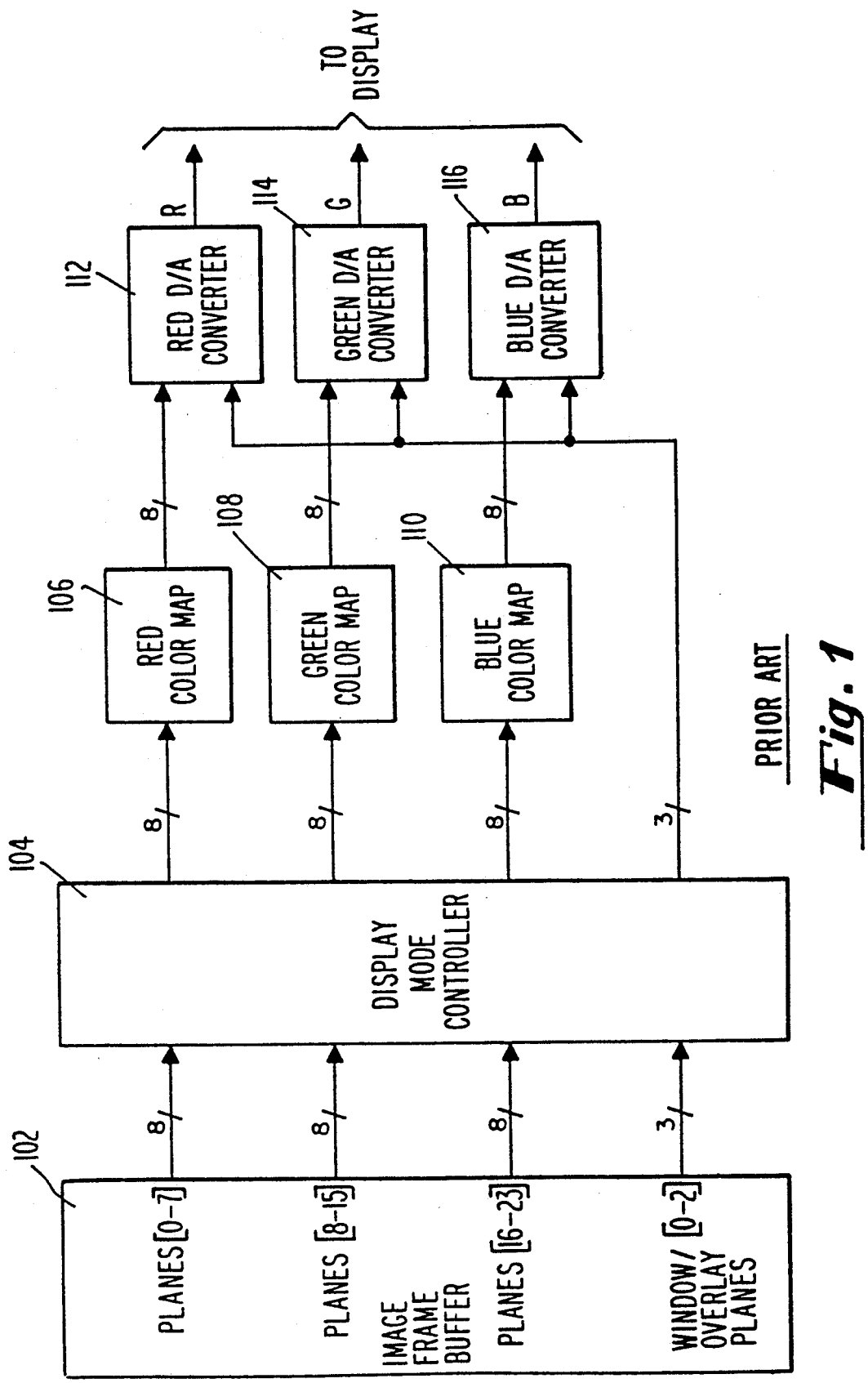
FIG. 1 schematically illustrates a prior art color display sub-system.
Figure 2:
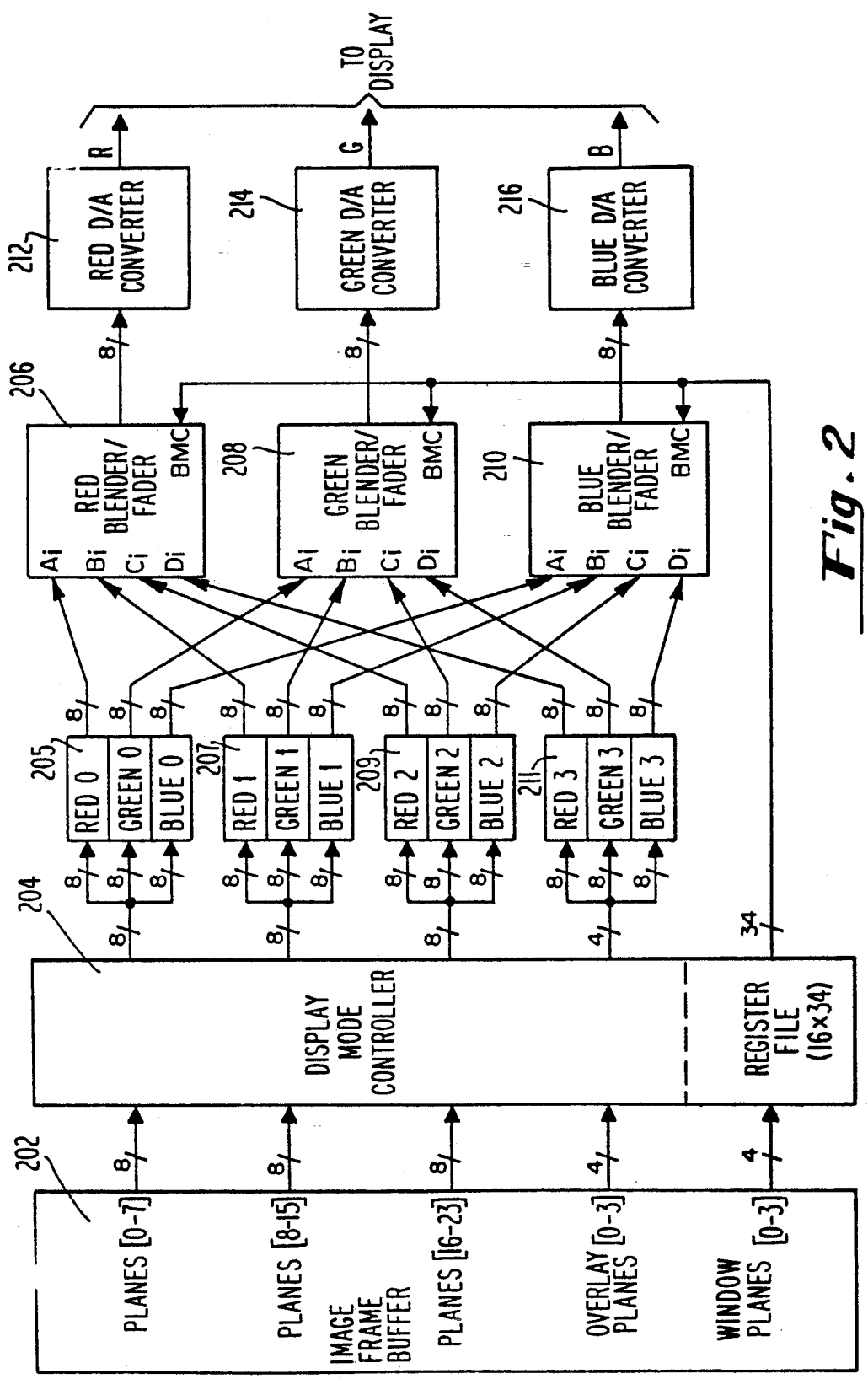
FIG. 2 schematically illustrates an improved display sub-system incorporating a digital image blending/fading circuit in accordance with the invention.

FIG. 2 shows the digital image blending/fading circuit in accordance with the invention. As with the prior art color display sub-system of FIG. 1, the circuit of FIG. 2 includes an image frame buffer 202, a display mode controller 204 and D/A converters 212, 214 and 216 for each color output. As shown, the image frame buffer 202 of the circuit of FIG. 2 allows up to 24 image planes in groups of eight to be output for display and a tag field of four planes which allows for sixteen unique windows. In accordance with the invention, the image planes may be developed by partitioning the image frame buffer 202 into groups of eight planes, whereby each group of eight planes represents one image (rather than having one 24 plane image as when no blending occurs). As noted above, each plane is one bit deep, and the number of planes determines the number of colors available as previously described. For example, given a group of eight image planes for each image, 256 colors are available for each image. As before, these images may be output to display mode controller 204 for creating different display modes such as full color, eight bit indexed, and the like.

As shown in FIG. 2, the image blending/fading circuit in accordance with the invention may be implemented within the context of four relatively standard color maps 205, 207, 209 and 211. Each of the color maps may be addressed with the indices of each image for providing the corresponding red, green and blue output values, which are then output to the corresponding blending/fading circuits of the invention. Blending/fading circuits 206, 208 and 210 are installed between the outputs of the color maps and the input of digital to analog converters 212, 214 and 216 as shown. Therefore, each of the blending/fading circuits 206, 208 and 210 is used for each color map data path, where each blending/fading circuit corresponds to a component color such as red, green or blue, as determined by a personality bit PER to be described below. As can be seen from FIG. 2, each blending/fading circuit may have an 8-bit connection to each color table 205, 207, 209 and 211 at respective outputs corresponding to the red, green or blue table sections.

Each blending/fading circuit has four separate 8-bit inputs, labelled $A_i$ through $D_i$, several bits of control information labelled BMC, and two bits of personality information labelled PER. In the illustrated embodiment, $A_i$ is an 8-bit input which is provided for respective color inputs for an "A" image, while $B_i$ and $C_i$ are the respective color inputs for the "B" and "C" images. The $D_i$ input, on the other hand, is provided for an overlay image determined from image data representing the four overlay planes from image frame buffer 202 as output from overlay/cursor color map 211. The BMC input is the blender mode control input which selects the extent to which each of the A, B, and C images are to be added to the overlay/cursor image at input D in accordance with the invention, while PER corresponds to the personality bits of each blending/fading circuit which determines whether the particular blending/fading circuit is a red, green or blue circuit. A DOM bit also may be provided for certain pixels to specify whether the overlay/cursor is to be dominant, or, in other words, to instruct the blending/fading circuit to ignore the mode control provided by the BMC and personality PER to pass only the overlay/cursor image to the output at a corresponding display point. Such bits may be used, for example, to outline a window on the display screen. Moreover, in accordance with the invention, the BMC input preferably contains scale data BF for permitting image fading and a NORM bit which determines whether image fading is to be conducted as will be described below.

The blend mode control (BMC) input to each blender is driven by the window planes provided from image frame buffer 202, the planes being translated through a window register file of appropriate size in the display mode controller 204. As shown in FIG. 2, the window register file may be implemented as 16 words by thirty-four bits for translating window tag bits to BMC inputs in a preferred embodiment. The window register file may be used to specify how to process each pixel within each window by specifying a different display mode for different windows of the display device. This is done by giving different BMC values to each window to be rendered on the display device. The window register file thus enables images within each window to be processed concurrently. Also, in order to facilitate image fading, the register file may contain eight scale bits for each image so that 32 scale bits BF for the four images ($A_i$, $B_i$, $C_i$, $D_i$) are output as part of the BMC signal to the blending/fading circuits. As shown in FIG. 4, the 34-bit BMC control signal also contains the DOM bit and the NORM bit, the latter indicating whether blending of images $A_i$–$D_i$ is to occur (NORM=0) or whether the input data is to be displayed as a single image (NORM=1). The 8-bit values of the scale bits BF are received from the register file of display mode controller 204 as indicated.

As will be described in more detail below with respect to FIG. 4, the user may select any combination of inputs to each of the blending/fading circuits under software control by altering the values in the window register files corresponding to the region of interest. The invention thus allows the display system to behave as would a typical single color map display system; however, the invention also provides the ability to sum output data from separate color maps to create a composite image including several windows, for example. The invention also allows the images from separate color maps to be faded in or out for visual effect.

The blending/fading circuits will now be described in more detail with respect to FIG. 3. FIG. 3 shows an example of a blending/fading circuit in accordance with the invention which is configured to allow compositing and clamping and/or fading of input image data. As shown, each image blending/fading circuit latches all input data for inputs $A_i$, $B_i$, $C_i$, and $D_i$ at latches 302, 304, 306 and 308, respectively, using a clock signal CLK which has a timing equal to one pixel duration. All data is then passed through a stage of multipliers 310, 312, 314, and 315, Which respectively function to fade the input images by amounts determined by the constants $k_A$–$k_D$, which are fractions between 0 and 1 determined from the scale bits BF. For example, $k_A$=BF[7-0]/255, $k_B$=BF[15-8]/255, $k_C$=BF[23-16]/255 and $k_D$=BF[31-24]/255. Hence, by varying $k_A$–$k_D$ between 0 and 1, the input image may be scaled between no image present ($k_i$=0) and entire image present ($k_i$=1). In the embodiment shown, each k value has $2^8$ (=256) levels determined from the 8-bit scale factors BF for each image, but other scaling ranges may of course be used as desired. In this manner, the images from image frame buffer 202 may be readily faded as desired without redrawing the entire image. Derivation of the $k_A$–$k_D$ values from the BMC inputs and the blender personality PER data inputs will be described in more detail below with respect to Table 1 and FIG. 4.

The sums of the processed inputs ($k_A A_i + k_B B_i$ + carry out) and ($k_C C_i + k_D D_i$ + carry out) are then determined in summers 316 and 318. The respective outputs of the summers 316 and 318 are then latched by latches 320, 322, 324 and 326, respectively, and the outputs of the latches are then clamped at OR circuits 328 and 330 to prevent the sums of adders 316 and 318 from exceeding the eight-bit value 255 by ORing the carry outs of the adders with the sums. In other words, $k_A A_i + k_{B2} B_i$ and $k_C C_i + k_D D_i$ are separately clamped to no more than 255 ($<2^8$). The sums of $k_A A_i + k_B B_i$ and $k_C C_i + k_D D_i$ are then determined at adder 332, and the result is clamped at OR circuit 334 to prevent the output from exceeding the 8-bit value 255 by ORing the carry out of adder 332 with the sum. Thus, $k_A A_i + k_B B_i + k_C C_i + k_D D_i$ must be less than 255. The result is then piped to the output by latch 336.

Thus, the $A_i$, $B_i$, $C_i$ and overlay/cursor image data $D_i$, as well as the mode (NORM) and the dominance (DOM) bits may be latched into the blending/fading circuits by the CLK signals in accordance with the invention. The blending/fading circuits accept the input data for one pixel every CLK cycle. Then the blended output result for each pixel is determined by the mode (NORM), the dominance (DOM), the personality (PER) and $k_A$–$k_D$ inputs as shown in the following TABLE 1:

TABLE 1

| NORM = 0 | | | NORM = 1 | |
|---|---|---|---|---|
| DOM = 0 | DOM = 1 | PER | DOM = 0 | DOM = 1 |
| $k_A A + k_B B +$ $k_C C + k_D D$ | $k_D D$ | 0 | $K_A A + k_D D$ | $k_D D$ |
| | | 1 | $k_B B + k_D D$ | $k_D D$ |
| | | 2 | $k_C C + k_D D$ | $k_D D$ |
| | | 3 | x | $k_D D$ |

The present embodiment of the invention thus allows for compositing and fading of up to four separate images from among four different images which are drawn from different planes of the frame buffer 202 on a per pixel (window oriented) basis, although in other embodiments additional images may be composited and faded by further subdividing the image frame buffer and providing additional hardware in accordance with the invention. As can be seen from FIG. 3, the output stage of the blending/fading circuit is really the quantity $k_A A_i + k_B B_i + k_C C_i + k_D D_i$ where the values $A_i$, $B_i$ and $C_i$ may be scaled to any values between 0 and full original intensity by the fractional values of $k_A$–$k_D$. This functionality allows the image to take on discrete values from 0 through $A_i + B_i + C_i + D_i$ as long as the sum does not exceed 255.

In particular, as shown in TABLE 1 and in FIG. 4, mode decoder 402 of the invention may determine how much to fade a given image by appropriately providing 8-bit outputs for $k_A$–$k_D$ between 0 and 1. For each mode decoder 402 of each blending/fading circuit, the color of the associated circuit is determined by the personality bits PER, and "zero" is provided for one of $k_A$–$k_D$ if the corresponding input image is not to be shown on the screen, while a value greater than zero is output for one of the k values if the corresponding image is to be blended for display. Each k value must be changed to scale the entire picture which, as indicated, includes the cursor or overlay image. The images to be blended are thus determined by the values of BF, NORM and DOM as shown in TABLE 1, which are latched to mode decoder 402 via latch 404 as shown in FIG. 4. As noted above, these values may determine whether to display particular overlay input planes for up to 16 window overlays, whereby the pixels in some windows may be blended but not in others. As previously indicated, 32-bits of BF data are provided so that 8 bits of scale data may be provided for each image. Of course, the number of bits may be changed as desired. In addition, the value of DOM specifies whether a given image such as an overlay or cursor is to have dominance over the other images (in the embodiment shown, image D may have dominance) such that only the pixels for that particular image are displayed whereas the pixel values for the other images are not displayed at the corresponding display pixel. As noted above, such is preferable for use in defining the boundaries around the windows.

Although an exemplary embodiment of the invention has been described in detail above, those skilled in the art will readily appreciate that many additional modifications are possible in the exemplary embodiments without materially departing from the novel teachings and advantages of the invention. For example, the output of mode decoder 402 may be varied to indicate whether the output is to be color or monochrome for each window, and the input value $D_i$ could be masked. Accordingly, all such modifications are intended to be included within the scope of this invention as defined in the following claims.

What is claimed:

1. A device for selectively fading a first digital image within a first display window of a display device into a second digital image within a second display window of said display device on a pixel by pixel basis, comprising:
    an image frame buffer which is subdivided along display window boundaries into said first and second digital images for display within said first and second display windows, respectively;
    at least one color map for each display window of said display device for translating digital representations of said first and second digital images into component colors of said first and second digital images;
    means for scaling said component colors of said first and second digital images on a pixel by pixel basis within said first and second display windows by multiplying pixels of said component colors of said first and second digital images by respective scaling factors between 0 and 1, said scaling means comprising a fading circuit for each component color of said first and second digital images and each fading circuit fading at least one of said component colors from each of said first and second digital images on a pixel by pixel basis;
    means for adding said scaled component colors of said first and second digital images on a pixel by pixel basis to get a faded sum image; and
    means for converting said faded sum image into an analog signal for display in a display window of said display device.

2. A device as in claim 1, wherein each fading circuit comprises means for scaling said first and second digital images by a scaling factor K, where $0 \leq K \leq 1$, and passing said scaled first and second digital images to said adding means for adding corresponding pixels of the same component color from said scaled first and second digital images, said adding means comprising clamping means for clamping said faded sum image to prevent oversaturation of the resulting image on said display device.

3. A device as in claim 1, further comprising a display mode controller for providing separate modes of display for said first and second display windows of said display device.

4. A method of selectively fading a first digital image within a first display window of a display device into a second digital image within a second display window of said display device on a pixel by pixel basis, comprising the steps of:
    subdividing an image frame buffer along display window boundaries into said first and second digital images for display within said first and second display windows, respectively;
    translating digital representations of said first and second digital images into component colors of said first and second digital images using at least one color map for each display window of said display device;
    scaling said component colors of said first and second digital images on a pixel by pixel basis within said first and second display windows by multiplying pixels of said component colors of said first and second digital images by respective scaling factors between 0 and 1 so as to fade at least one of said component colors from each of said first and second digital images on a pixel by pixel basis;
    adding said scaled component colors of said first and second digital images on a pixel by pixel basis to get a faded sum image; and
    converting said faded sum image into an analog signal for display in a display window of said display device.

5. A method as in claim 4, wherein said adding step comprises the steps of adding corresponding pixels of the same component color from said scaled first and second digital images and clamping said faded sum image to prevent oversaturation of the resulting image on said display device.

6. A method as in claim 4, comprising the further step of providing separate modes of display for said first and second display windows of said display device.

* * * * *